(12) United States Patent
Claudatos et al.

(10) Patent No.: US 8,244,542 B2
(45) Date of Patent: *Aug. 14, 2012

(54) VIDEO SURVEILLANCE

(75) Inventors: Christopher Hercules Claudatos, San Jose, CA (US); William Dale Andruss, Minneapolis, MN (US); Richard Urmston, Westborough, MA (US); John Louis Acott, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 424 days.

This patent is subject to a terminal disclaimer.

(21) Appl. No.: 11/097,887

(22) Filed: Mar. 31, 2005

(65) Prior Publication Data

US 2006/0004582 A1    Jan. 5, 2006

(51) Int. Cl.
*G10L 21/00* (2006.01)

(52) U.S. Cl. ........... 704/275; 89/1.11; 725/46; 709/231; 709/223; 705/27; 705/17; 705/14.35; 704/278; 704/273; 704/270.1; 704/235; 704/231; 704/215; 704/2; 700/83; 700/245; 379/88.01; 379/45; 379/48; 348/48; 348/14.09; 348/14.08; 345/473

(58) Field of Classification Search ........... 704/275, 704/2, 231, 273, 235, 278, 270.1, 215; 348/48, 348/14.08, 14.09; 705/27, 17, 14.35; 379/88.01, 379/45; 89/1.11; 725/46; 709/231, 223; 700/83, 245; 345/473

See application file for complete search history.

(56) References Cited

U.S. PATENT DOCUMENTS

| | | | |
|---|---|---|---|
| 4,831,438 A | | 5/1989 | Bellman et al. |
| 5,027,104 A | | 6/1991 | Reid |
| 5,053,868 A | | 10/1991 | Higgins et al. |
| 5,086,385 A | * | 2/1992 | Launey et al. ............... 700/83 |
| 5,454,037 A | | 9/1995 | Pacella |
| 5,729,694 A | * | 3/1998 | Holzrichter et al. ........... 705/17 |
| 5,758,079 A | | 5/1998 | Ludwig et al. |
| 5,793,419 A | | 8/1998 | Fraley |
| 5,867,494 A | | 2/1999 | Krishnaswamy et al. |
| 5,905,988 A | | 5/1999 | Schwartz et al. |
| 5,946,050 A | | 8/1999 | Wolff |
| 5,987,454 A | | 11/1999 | Hobbs |
| 6,064,963 A | | 5/2000 | Gainsboro |
| 6,064,964 A | | 5/2000 | Yamamoto et al. |
| 6,067,095 A | * | 5/2000 | Danieli ........................ 345/473 |
| 6,115,455 A | | 9/2000 | Picard |
| 6,137,864 A | | 10/2000 | Yaker |
| 6,192,111 B1 | | 2/2001 | Wu |
| 6,192,342 B1 | * | 2/2001 | Akst ............................ 704/275 |
| 6,233,313 B1 | | 5/2001 | Farris et al. |
| 6,243,676 B1 | | 6/2001 | Witteman |
| 6,246,933 B1 | | 6/2001 | Bague |
| 6,278,772 B1 | | 8/2001 | Bowater et al. |

(Continued)

*Primary Examiner* — Michael Colucci

(74) *Attorney, Agent, or Firm* — Theodore A. Chen; Krishnendu Gupta

(57) ABSTRACT

A method, article of manufacture, and apparatus for monitoring a location having a plurality of audio sensors and video sensors are disclosed. In an embodiment, this comprises receiving auditory data, comparing a portion of the auditory data to a lexicon comprising a plurality of keywords to determine if there is a match to a keyword from the lexicon, and if a match is found, selecting at least one video sensor to monitor an area to be monitored. Video data from the video sensor is archived with the auditory data and metadata. The video sensor is selected by determining video sensors associated with the areas to be monitored. A lookup table is used to determine the association. Cartesian coordinates may be used to determine positions of components and their areas of coverage.

20 Claims, 6 Drawing Sheets

U.S. PATENT DOCUMENTS

| | | | |
|---|---|---|---|
| 6,278,992 B1 | 8/2001 | Curtis et al. | |
| 6,289,382 B1 | 9/2001 | Bowman-Amuah | |
| 6,311,159 B1 | 10/2001 | Van Tichelen et al. | |
| 6,327,343 B1 | 12/2001 | Epstein et al. | |
| 6,345,252 B1 | 2/2002 | Beigi et al. | |
| 6,377,663 B1 | 4/2002 | Thurber | |
| 6,404,856 B1 | 6/2002 | Wilcox et al. | |
| 6,438,594 B1 | 8/2002 | Bowman-Amuah | |
| 6,469,732 B1 * | 10/2002 | Chang et al. | 348/14.08 |
| 6,522,727 B1 | 2/2003 | Jones | |
| 6,539,077 B1 | 3/2003 | Ranalli et al. | |
| 6,539,354 B1 | 3/2003 | Sutton et al. | |
| 6,542,500 B1 | 4/2003 | Gerszberg et al. | |
| 6,542,602 B1 | 4/2003 | Elazar | |
| 6,549,949 B1 | 4/2003 | Bowman-Amuah | |
| 6,564,687 B2 * | 5/2003 | Poole | 89/1.11 |
| 6,577,333 B2 | 6/2003 | Tai et al. | |
| 6,591,239 B1 * | 7/2003 | McCall et al. | 704/275 |
| 6,593,956 B1 * | 7/2003 | Potts et al. | 348/14.09 |
| 6,633,835 B1 | 10/2003 | Moran et al. | |
| 6,661,879 B1 | 12/2003 | Schwartz et al. | |
| 6,662,178 B2 | 12/2003 | Lee | |
| 6,665,376 B1 | 12/2003 | Brown | |
| 6,697,796 B2 | 2/2004 | Kermani | |
| 6,721,706 B1 * | 4/2004 | Strubbe et al. | 704/275 |
| 6,728,679 B1 * | 4/2004 | Strubbe et al. | 704/270.1 |
| 6,731,307 B1 | 5/2004 | Strubbe et al. | |
| 6,732,090 B2 | 5/2004 | Shanahan et al. | |
| 6,732,109 B2 | 5/2004 | Lindberg et al. | |
| 6,748,360 B2 | 6/2004 | Pitman et al. | |
| 6,772,125 B2 * | 8/2004 | Harradine et al. | 704/278 |
| 6,781,962 B1 | 8/2004 | Williams et al. | |
| 6,784,899 B1 | 8/2004 | Barrus et al. | |
| 6,785,370 B2 | 8/2004 | Glowny et al. | |
| 6,795,808 B1 | 9/2004 | Strubbe et al. | |
| 6,807,574 B1 | 10/2004 | Partovi et al. | |
| 6,816,085 B1 | 11/2004 | Haynes et al. | |
| 6,820,075 B2 | 11/2004 | Shanahan et al. | |
| 6,862,566 B2 * | 3/2005 | Wakita et al. | 704/2 |
| 6,889,232 B2 | 5/2005 | Pudipeddi et al. | |
| 6,930,599 B2 | 8/2005 | Naidoo et al. | |
| 6,934,756 B2 | 8/2005 | Maes | |
| 6,937,986 B2 | 8/2005 | Denenberg et al. | |
| 6,961,763 B1 * | 11/2005 | Wang et al. | 709/223 |
| 6,961,954 B1 | 11/2005 | Maybury et al. | |
| 6,968,364 B1 | 11/2005 | Wong et al. | |
| 7,007,048 B1 | 2/2006 | Murray et al. | |
| 7,027,565 B2 * | 4/2006 | Tateishi et al. | 379/88.01 |
| 7,039,585 B2 | 5/2006 | Wilmot et al. | |
| 7,058,565 B2 | 6/2006 | Gusler et al. | |
| 7,069,291 B2 | 6/2006 | Graves et al. | |
| 7,117,158 B2 | 10/2006 | Weldon et al. | |
| 7,133,511 B2 | 11/2006 | Buntin et al. | |
| 7,177,800 B2 | 2/2007 | Wallers | |
| 7,191,133 B1 | 3/2007 | Pettay | |
| 7,260,190 B2 | 8/2007 | Fellenstein et al. | |
| 7,302,394 B1 | 11/2007 | Baray et al. | |
| 7,356,474 B2 | 4/2008 | Kumhyr | |
| 7,440,558 B2 | 10/2008 | Heilmann et al. | |
| 7,444,287 B2 | 10/2008 | Claudatos et al. | |
| 7,457,396 B2 | 11/2008 | Claudatos et al. | |
| 7,499,531 B2 | 3/2009 | Claudatos et al. | |
| 2001/0036821 A1 | 11/2001 | Gainsboro et al. | |
| 2001/0038624 A1 | 11/2001 | Greenberg et al. | |
| 2001/0055372 A1 | 12/2001 | Glowny et al. | |
| 2002/0002460 A1 | 1/2002 | Pertrushin | |
| 2002/0032564 A1 * | 3/2002 | Ehsani et al. | 704/235 |
| 2002/0105598 A1 | 8/2002 | Tai et al. | |
| 2002/0107694 A1 * | 8/2002 | Lerg | 704/273 |
| 2002/0110264 A1 | 8/2002 | Sharoni et al. | |
| 2002/0122113 A1 * | 9/2002 | Foote | 348/48 |
| 2002/0143797 A1 | 10/2002 | Zhang et al. | |
| 2002/0168058 A1 | 11/2002 | Gailbraith | |
| 2003/0018531 A1 | 1/2003 | Mahaffy et al. | |
| 2003/0033287 A1 | 2/2003 | Shanahan et al. | |
| 2003/0033294 A1 | 2/2003 | Walker et al. | |
| 2003/0050785 A1 * | 3/2003 | Friedrich et al. | 704/275 |
| 2003/0058277 A1 | 3/2003 | Bowman-Amuah | |
| 2003/0074404 A1 | 4/2003 | Parker et al. | |
| 2003/0078973 A1 | 4/2003 | Przekop et al. | |
| 2003/0088573 A1 | 5/2003 | Stickler | |
| 2003/0093260 A1 | 5/2003 | Dagtas et al. | |
| 2003/0093794 A1 * | 5/2003 | Thomas et al. | 725/46 |
| 2003/0097365 A1 | 5/2003 | Stickler | |
| 2003/0101104 A1 * | 5/2003 | Dimitrova et al. | 705/27 |
| 2003/0112259 A1 | 6/2003 | Kinjo | |
| 2003/0120390 A1 * | 6/2003 | Hopkins | 700/259 |
| 2003/0144844 A1 * | 7/2003 | Colmenarez et al. | 704/273 |
| 2003/0158839 A1 | 8/2003 | Faybishnenko et al. | |
| 2003/0182308 A1 | 9/2003 | Ernst et al. | |
| 2003/0182387 A1 | 9/2003 | Geshwind | |
| 2003/0191911 A1 | 10/2003 | Kleinschnitz et al. | |
| 2003/0193994 A1 | 10/2003 | Stickler | |
| 2003/0221013 A1 * | 11/2003 | Lockwood et al. | 709/231 |
| 2003/0225801 A1 | 12/2003 | Devarakonda et al. | |
| 2003/0227540 A1 | 12/2003 | Monroe | |
| 2003/0233278 A1 * | 12/2003 | Marshall | 705/14 |
| 2003/0236788 A1 | 12/2003 | Kanellos et al. | |
| 2004/0002868 A1 | 1/2004 | Geppert et al. | |
| 2004/0003132 A1 | 1/2004 | Stanley et al. | |
| 2004/0006506 A1 | 1/2004 | Hoang | |
| 2004/0008828 A1 | 1/2004 | Coles et al. | |
| 2004/0010415 A1 | 1/2004 | Seo et al. | |
| 2004/0010519 A1 | 1/2004 | Sinn et al. | |
| 2004/0024762 A1 | 2/2004 | Agarwal et al. | |
| 2004/0030741 A1 | 2/2004 | Wolton et al. | |
| 2004/0054531 A1 * | 3/2004 | Asano | 704/231 |
| 2004/0083101 A1 | 4/2004 | Brown et al. | |
| 2004/0083244 A1 | 4/2004 | Muecklich et al. | |
| 2004/0085203 A1 | 5/2004 | Junqua | |
| 2004/0111639 A1 | 6/2004 | Schwartz et al. | |
| 2004/0127286 A1 | 7/2004 | Fujimoto | |
| 2004/0143602 A1 | 7/2004 | Ruiz et al. | |
| 2004/0167890 A1 | 8/2004 | Eyal | |
| 2004/0186726 A1 | 9/2004 | Grosvenor | |
| 2004/0199494 A1 | 10/2004 | Bhagg | |
| 2004/0199566 A1 | 10/2004 | Carlson et al. | |
| 2004/0203577 A1 | 10/2004 | Forman et al. | |
| 2004/0221261 A1 | 11/2004 | Blevins | |
| 2004/0235520 A1 | 11/2004 | Cadiz et al. | |
| 2004/0247086 A1 * | 12/2004 | Menard et al. | 379/45 |
| 2004/0249790 A1 | 12/2004 | Komamura | |
| 2004/0263636 A1 | 12/2004 | Cutler et al. | |
| 2005/0015286 A1 | 1/2005 | Rudnik et al. | |
| 2005/0069095 A1 | 3/2005 | Fellenstein et al. | |
| 2005/0080619 A1 * | 4/2005 | Choi et al. | 704/215 |
| 2005/0131559 A1 | 6/2005 | Kahn et al. | |
| 2006/0010150 A1 | 1/2006 | Shaath et al. | |
| 2006/0079998 A1 * | 4/2006 | Yoshikawa et al. | 700/245 |
| 2006/0095502 A1 | 5/2006 | Lewis et al. | |

* cited by examiner

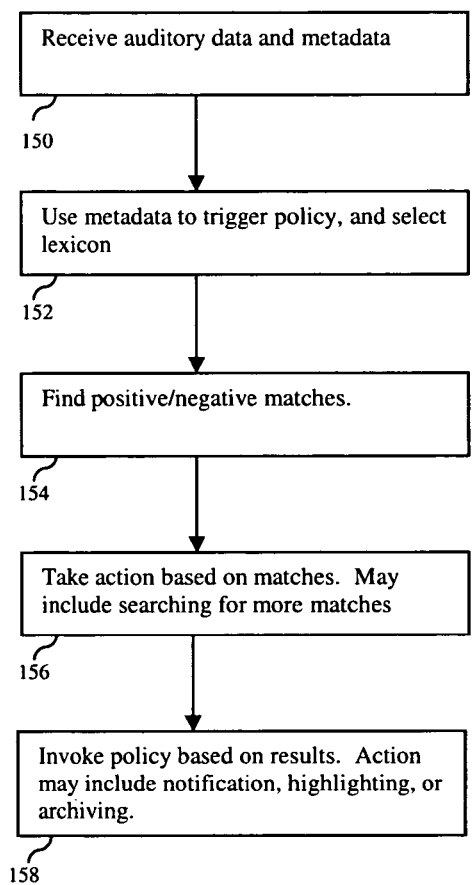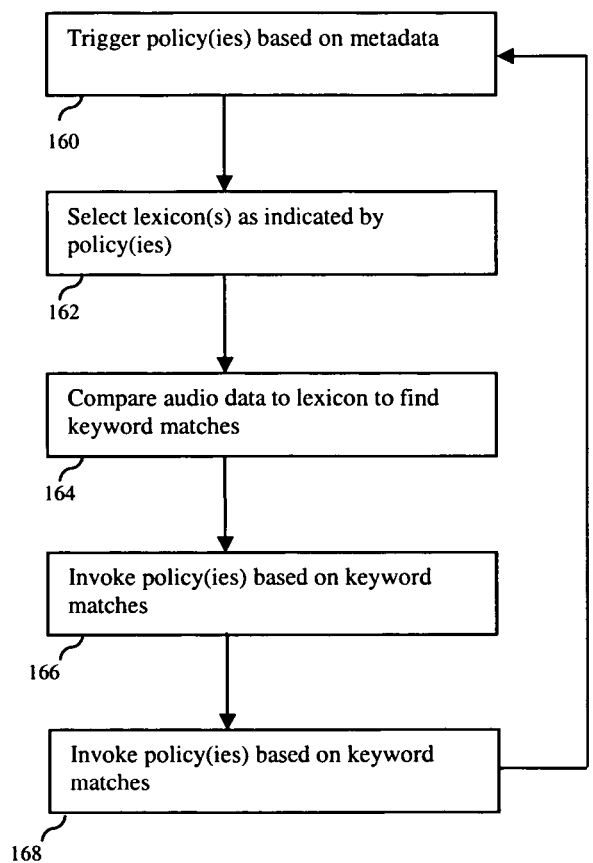
FIG. 8
FIG. 9

VIDEO SURVEILLANCE

CROSS REFERENCE TO RELATED APPLICATIONS

This application claims priority to co-pending U.S. patent application Ser. No. 10/884,453 for METHOD AND SYSTEM FOR PROCESSING AUDITORY COMMUNICATIONS, filed Jul. 1, 2004, which is incorporated herein by reference for all purposes. This application is related to co-pending U.S. patent application Ser. No. 11/096,962 for EFFICIENT MONITORING SYSTEM AND METHOD and filed concurrently herewith, which is incorporated herein by reference for all purposes; to co-pending U.S. patent application Ser. No. 11/096,816 for ARCHIVING OF SURVEILLANCE DATA and filed concurrently herewith, which is incorporated herein by reference for all purposes; and to co-pending U.S. patent application Ser. No. 11/097,894 for FLEXIBLE VIDEO SURVEILLANCE and filed concurrently herewith, which is incorporated herein by reference for all purposes.

FIELD OF THE INVENTION

This invention relates generally to surveillance systems and methods, and more particularly to a video surveillance system and method that uses auditory monitoring in providing effective video surveillance.

BACKGROUND

This invention relates to a surveillance system for simultaneously observing a plurality of locations. Surveillance systems have been used for a wide variety of purposes, such as providing security for users of a site, preventing theft or fraud, and monitoring to ensure compliance with operating procedures.

Typically, such systems involve a plurality of video cameras disposed at the monitored site, arranged to cover various locations of interest at the site. The video cameras may be configured to pan, zoom, and tilt to increase their usefulness in monitoring. Auditory monitoring equipment in the form of microphones may be placed at some locations and may be associated with particular video cameras to provide auditory surveillance as well.

Feeds from the video cameras and/or microphones may be sent to a central viewing location, where video and audio data may be recorded, and monitored in real time by security personnel. One or more video displays and/or speakers may be provided to allow a user or users to observe events taking place in the areas monitored by the surveillance equipment. This can be implemented in a number of ways, such as a dedicated display for each video camera, and a switch to select the audio feed for a particular camera of interest. Another way is to associate several video cameras with a display, and time multiplex the video feeds such that the display shows each video feed for a short period of time before switching to the next. A similar approach may be used with audio feeds and a speaker. Controls may be provided for the user to focus on a particular video feed and/or audio feed of interest.

However, economics often dictate having a single user monitor a large number of video and/or audio feeds. This increases the likelihood that the user may miss an event of interest, and becomes a limiting factor in the number of feeds a user can adequately monitor. Most of the time, the images displayed and audio heard are of little interest to security personnel, who must continually watch the images from multiple cameras and attempt to spot suspicious activity.

In addition, if all video and/or audio feeds are recorded, they are typically associated with a particular video camera and/or microphone, and may have timestamps. In order to find an event of interest, a user must determine which camera may have recorded the event and the approximate time of the event, and manually examine the recording to locate the event. This is a time-consuming task, and if the camera and approximate time are not known, many recordings will have to be examined.

There is a need, therefore, for an improved method, article of manufacture, and apparatus for monitoring, recording, archiving, indexing, retrieving, processing, and managing surveillance data.

BRIEF DESCRIPTION OF THE DRAWINGS

The present invention will be readily understood by the following detailed description in conjunction with the accompanying drawings, wherein like reference numerals designate like structural elements, and in which:

FIG. 8 is a flowchart illustrating audio data processing;

FIG. 9 is a flowchart illustrating audio data processing using policies; and

DESCRIPTION OF THE INVENTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

An embodiment of the invention will be described with reference to a video surveillance system using auditory monitoring, but it should be understood that the principles of the invention are not limited to surveillance systems. Rather, they may be applied to any system in which data is collected in conjunction with auditory data. Disclosed herein are a method and system to monitor, record, archive, index, retrieve, perform auditory data-to-text processing, and control presentation of data representing video and auditory information collected by a plurality of video and audio sensors. In particular, the foregoing will be described with respect to a video surveillance system utilizing video sensors in the form of video cameras and audio sensors in the form of microphones in selected locations. The microphones may be associated with one or more video cameras, and the video cameras may be associated with one or more microphones. It should be understood that video cameras and microphones are described herein by way of example, and the principles of the invention are equally applicable to any sensor capable of receiving visual or auditory information.

Figure 1:
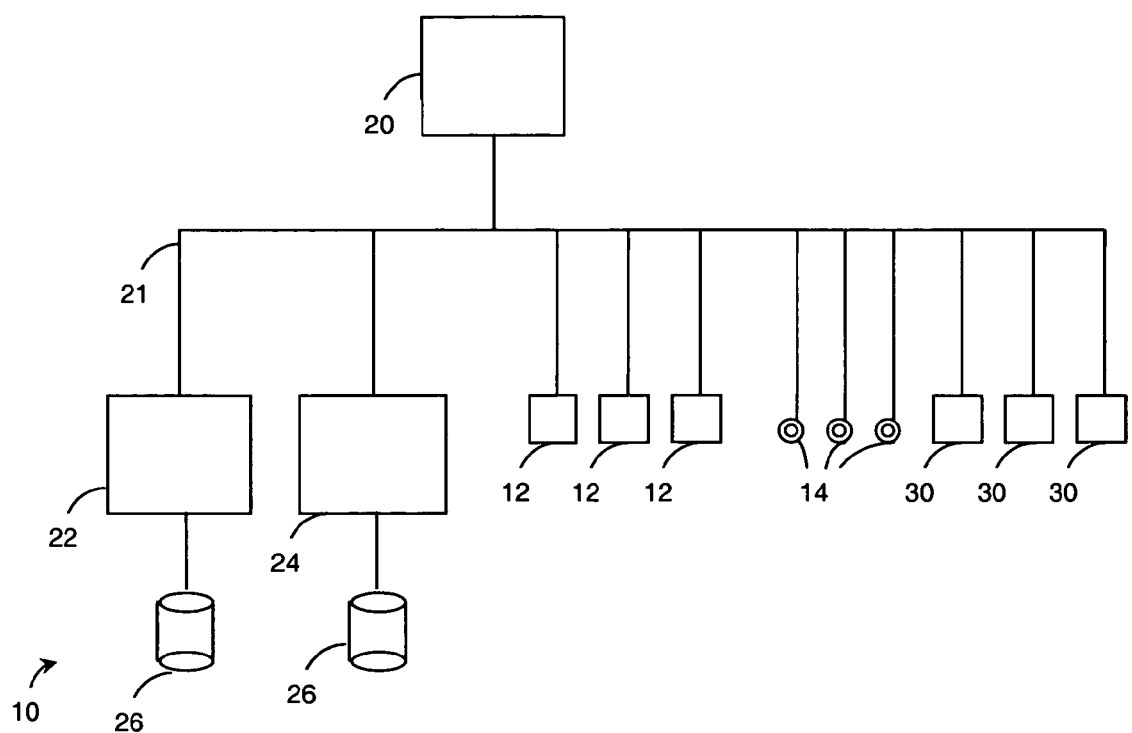
FIG. 1 is a diagram of a surveillance system.

An exemplary embodiment of the surveillance system is shown in FIG. 1. Surveillance system 10 comprises a plurality of visual sensors in the form of video cameras 12, auditory sensors in the form of microphones 14, a console 20, an processing system 22, and an audio/video (AV) server 24, communicating with each other via a network 21. In an embodiment, the microphones 14 may be configured to send data in a format compatible with TCP/IP, such as Voice over Internet Protocol. Similarly, video cameras 12 may also be configured to send video data over a TCP/IP network. In other embodiments, the video cameras 12 and/or microphones 14 may send analog data directly to the AV server over a separate dedicated network (not shown), and the AV server may be equipped with analog to digital converters to convert the analog data into digital data.

Figure 2:
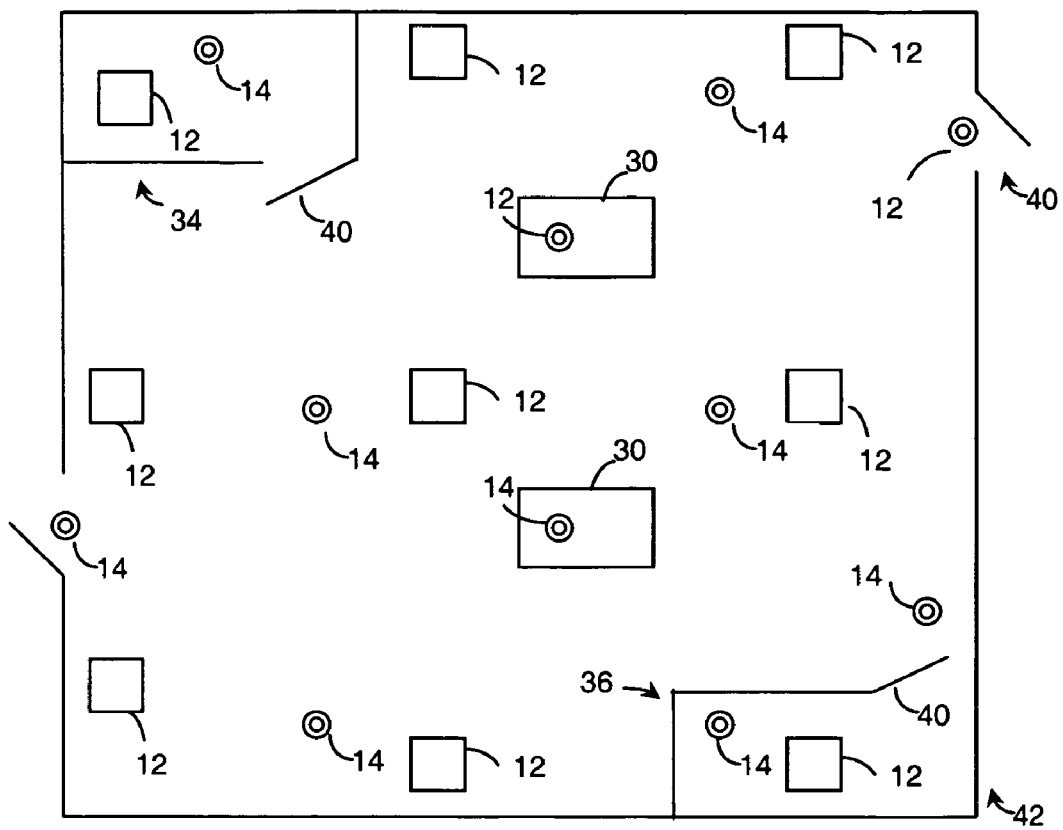
FIG. 2 is a diagram of components of a surveillance system deployed at a location.

FIG. 2 illustrates an embodiment of a surveillance system deployed in a retail sales environment. It should be understood that other kinds of deployments are possible, such as in banks, parking lots, warehouses, manufacturing centers, prisons, courthouses, airports, schools, etc. As shown in FIG. 2, the site 42 has a plurality of microphones 14 (devices capable of serving as audio sensors) disposed at various locations around the site. These microphones may be placed at locations of interest, such as cash registers 30, doors 32, goods storage 34, office 36, and any other location that may be desirable to monitor for events of interest. Cash register information may optionally be used by the surveillance system 10, and cash registers 30 may be connected via network 21. Other sensors, such as Radio Frequency Identification (RFID) sensors, explosives detectors, biological detectors, fire or smoke detectors, motion sensors, door sensors, etc. may be connected to the surveillance system 10. Video sensors in the form of video cameras 12 are disposed around the site to monitor locations of interest, and may be configured to monitor the general regions in which the microphones 14 are placed. The video cameras may be configured to pan, zoom, and tilt, or otherwise be operable to view an area. The video cameras may be capable of sensing electromagnetic radiation across the spectrum, such as visible light, infrared, microwave, millimeter wave, ultraviolet, x-ray, and TV/radio waves. The cameras may have lenses or other means for converging or diverging radiation. In an embodiment, a microphone 14 and a video camera 12 may be packaged as a unit. As shown in FIG. 2, microphones 14 and video cameras 12 may be separate and may not necessarily be in a one-to-one correspondence with each other. Microphones 14 may not necessarily be in the same location as the video cameras 12. Console 20 may be remotely located from the site 42.

Figure 3:
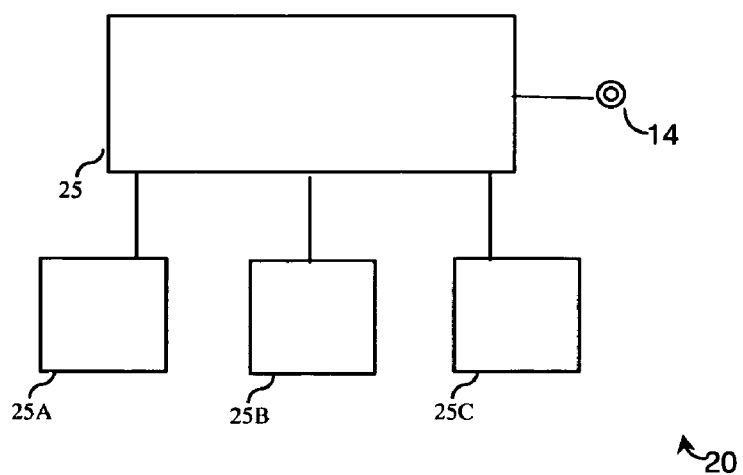
FIG. 3 is a diagram of an embodiment of a console.
Figure 4:
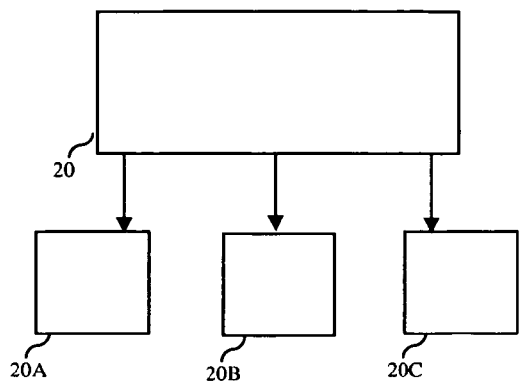
FIG. 4 is a diagram illustrating the use of multiple consoles for monitoring.

As shown in FIG. 3, in an embodiment, the console 20 may comprise a computer system 25, display or a plurality of displays 25A, keyboard 25B, and speakers 25C. The displays 25A could also be associated with the surveillance system 10 such as via the AV server 24. Microphones 14 may be provided at the console 20 for recording observations, statements, and communications made by security personnel at the console 20. Console 20 may be associated with several sites. In an embodiment, shown in FIG. 4, a site 42 may be associated with several consoles 20A, 20B, and 20C, for example, which are in different locations (such as in different monitoring centers in other states). Any number of consoles may be connected to any number of sites, and connection may be made via a Wide Area Network or other means of connection.

Data from a microphone 14 may be in analog or digital form. In an embodiment, a microphone 14 may be configured to communicate via a Voice over Internet Protocol (VoIP) network. A plurality of microphones 14 conveying audio data (such as auditory communications) may be connected to an IP network 21, and send VoIP data over the network 21 to an processing system 22. In an embodiment, the auditory data may be sent to AV system 24 and to processing system 22 (either copied or passed on by either the AV system 24 or processing system 22). The processing system 22 may be configured to receive the VoIP data representing the auditory data via the network 21, perform a series of optional processes on the data in order to monitor its content (its significance or linguistic meaning), record the data, archive the recorded data, index the content or meaning of the data, retrieve the recorded data from the archive, and control the operation of the AV system 24, including selection of video data from video cameras 12 to be displayed or highlighted. Such a solution makes use of network-data-to-text processing for identification of keywords, phrases, or other sounds, and/or for conversion of the entire data set/traffic representing auditory data into text. It should be understood that the various functions may be performed not only by the processing system 22, but also by other components in the surveillance system 10, and the principles of the invention are equally applicable to such configurations.

In an embodiment, AV system 24 may be configured with storage 26 for storing audio and video data and metadata. Any number of formats may be used, such as MP3, WMA, MPEG, WMV, Quicktime, etc., and storage 26 may comprise any number and type of storage devices such as hard drive arrays connected via a Storage Area Network, RAID, etc. Audio and video data may be stored together or separately. The AV system 24 may receive audio data from the microphones 14 or from processing system 22, as well as from console 20. In an embodiment, audio data from microphones 14 may be sent to the AV system 24 for recording and presentation to the user. The AV system 24 may pass the data to processing system 22 for analysis. Processing system 22 may send control signals and metadata about the audio data to AV system 24. In response to the control signals, AV system 24 may record the metadata with the audio data and/or video data. The metadata may include information regarding keywords found in the audio data, policies invoked, time, location, association to other audio or video data, association to other data (such as cash register data), etc. Keywords may comprise auditory elements such as spoken words, but may also include sounds such as gunshots, explosions, screams, fire alarms, motion detector alarms, water, footsteps, tone of voice, etc.

Figure 5:
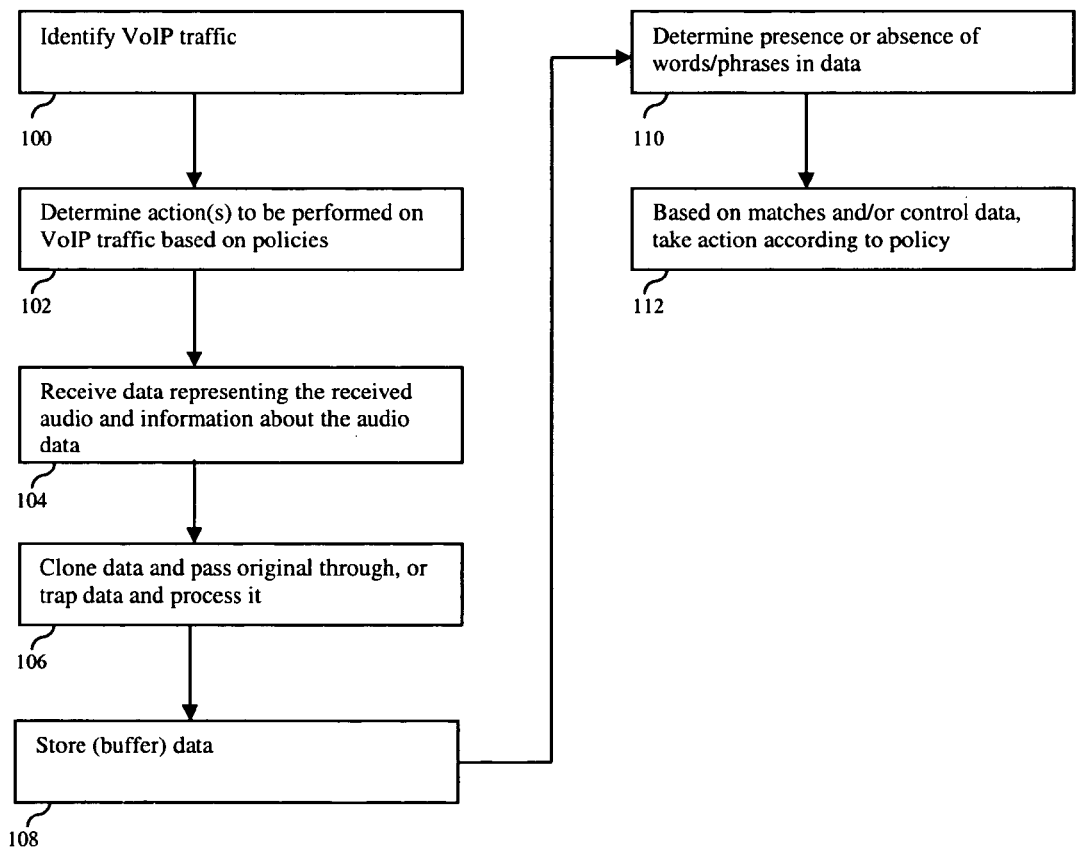
FIG. 5 is a flowchart illustrating processing of audio data.

FIG. 5 illustrates the method. The method may be implemented in a network appliance system configured to identify VoIP network traffic, step 100, determine the course of action(s) to be performed based on predefined or dynamic policies, step 102, receive VoIP network data representing the voice portion of the auditory communication, step 104, clone or "tap" the data so that the flow of data between source and destination is unimpeded or trap the traffic and perform further processing before permitting its passage and/or cloning, step 106, and store the data in its native format or in any other changed format to a storage medium together with other relevant information (such as source IP address, location of the microphone 14, time, date, etc.), step 108.

The system may scan the network data representing the auditory portion of the network traffic for the presence or absence of keywords and/or phrases through a network-data-to-text processing system, step 110, or convert the entire data set/traffic representing auditory data/communications into text, optionally index the recorded data and the associated text ("Conversation Text") from the network-data-to-text process, store the text from the network-data-to-text process, and compare the Conversation Text to a predefined lexicon of words and/or phrases. If keywords representing sounds are found, an identifier may be embedded in the Conversation Text. For example, if a gunshot is found in the audio data, an identifier representing the presence of a gunshot could be embedded in the Conversation Text. Based on positive matches and/or negative matches (lack of match), the system may take specific action as determined by the appropriate policy, step 112. This may also be determined by reference to control data. For example, such actions include but are not limited to recording, notification of users or third parties, signaling the console 20, controlling the AV system 24, selecting video camera displays for highlighting, etc. Some or all of the foregoing elements may be utilized in accordance with the principles of the invention. The system may compare the data to a lexicon containing auditory representations of words directly, without first converting the entire data set/traffic into text.

In an embodiment, a processing system is used to process auditory communications. It should be understood that the term "communication" is used to refer to auditory data capable of conveying or representing meaning, and that it is not limited to intentional communication. The sound of an explosion in the auditory data has significance and this auditory data may be referred to as a "communication" herein. The processing system 22 may comprise a processor in the form of a computer system, configured to receive auditory data from a source of audio signals, such as microphones, either standalone or incorporated into other devices such as video cameras. Multiple network interface cards may be used to connect the processing system 22 to the surveillance network on which VoIP traffic is present. The processing system 22 may be integrated with the function of the AV system 24 and/or console 20, or be a standalone system to which the surveillance system 10 sends data. The processing system 22 may be attached to the network and its functionality invoked when explicitly instructed by a user/administrator or system-based policy. This may be added externally to surveillance systems or made an integral element of a surveillance system.

A variety of methods may be used to give the processing system 22 access to the auditory data. The processing system 22 may be configured to operate and perform its functions at a point in the network where all VoIP traffic is processed such as at the AV system's connection to the network, thereby providing access to all VoIP traffic regardless of their source. Audio traffic to the AV system 24 from the microphones 14 may be passed on by the AV system 24 to processing system 22, or cloned and the duplicate audio data passed to the processing system 22. This functionality could be performed by a VoIP switch or gateway. The microphones 14 may be analog and pass their data over dedicated lines to a gateway that converts the data into VoIP for transmission on the network 21 to AV system 24. Similarly, audio information from the console 20 (such as statements made by the user or users) may be processed by the processing system 22 and recorded by the AV system 24. This could, for example, be used to add security personnel's observations, actions, and communications (such as with police) for record-keeping, indexing, evidentiary, and other purposes.

In an embodiment, the processing system 22 may be placed inline with the flow of VoIP traffic to the AV system 24. This configuration may be added to VoIP systems through external means without change to the VoIP system, other than the addition of the processing system 22 inline with the flow of VoIP data. VoIP data may be identified by scanning the headers of IP packets on the network, or by knowing the IP address, MAC address, or port of the various VoIP devices on the network and scanning packets going to and from those devices. A VoIP network switch may be configured to send a duplicate copy of an audio stream to the processing system 22, while permitting the original audio stream to continue to its destination, thus cloning or "tapping" the data stream. The duplication of IP packets can be done either in hardware or software. The switch may also be configured to redirect the original audio stream to the processing system 22, which may pass the original audio stream to its destination immediately or after analyzing and processing it.

Audio metadata may be passed to the processing system 22. The audio data information may include information such as time of day, Source Address (SA), Destination Address (DA), microphone identifier, etc.

The processing system 22 identifies keywords within an audio data stream or communication, in order to generate additional metadata that provides additional information and characterization of the content of the audio data. A keyword is an auditory element or representation of an audio element, text element, or both, and may be a spoken word or utterance but is not limited to speech. It could, for example, be a gunshot, scream, explosion, or a distinctive sound. The keyword may be found in a lexicon kept by the system, and more than one lexicon may be used by the system. Although several lexicons may be used, it should be understood that they may be referred to collectively as constituting a single lexicon. The keyword identification can be done by the system itself or an ancillary system in communication with the processing system 22. Automatic Speech Recognition (ASR) systems attempt to provide a complete transcription of audio data through the use of Speech-to-Text (STT) technology which renders the entire audio data content (when it comprises speech) into text. The keyword may be extracted from the rendered text.

The performance of keyword/phrase scanning and/or speech-to-text processing can be optionally performed in real-time or deferred for later processing. This would be determined by policy or administrator settings/preferences. For purposes of review for accuracy, the conversation text and audio recording can be indexed to each other, as well as to a video recording. In this way, comparisons and associations can be made between the recordings and the conversation text.

Figure 6:
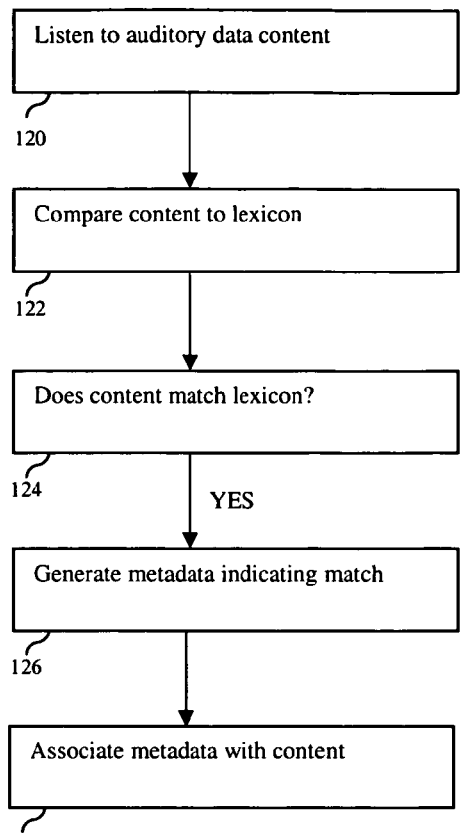
FIG. 6 is a flowchart illustrating processing of an auditory communication and using metadata to track matched keywords.

In an embodiment, shown in FIG. 6, rather than attempting to render the auditory data communication content to text or perform a STT process to render the communication's content to text, the processing system 22 may listen to the communication's content, step 120, and compare the content to a list of elements specified in a lexicon that comprises a group of data elements consisting of auditory elements or representations of audio elements (keywords) associated to text or other data elements, step 122. Upon detection of communication content that matches lexicon content, step 124, metadata may be generated in step 126 and associated with the communication content in step 128. Such metadata may be the text equivalent of the auditory content or it may be a pointer to other data held within the lexicon.

The system can search for keywords in the auditory communication that positively match keywords in the lexicon. The search for keywords within a communication may further specify:

- The order of the appearance/sequence (e.g., "Buy" followed by "Stock")
- Specific inter-keyword distance ("Buy" followed by "Stock" as the next word)
- The number of repetitions within a timeframe or communication session
- The inverse of the above:
  - Keywords are present but not in the specific sequence
  - Keywords are present but not within the inter-keyword distance
  - Keywords are present but not repeated within specification
- The absence of the keyword(s); i.e. a non-match or negative match
- Groups of keywords A keyword may correspond to a spoken utterance, but could also correspond to any auditory pattern such as a gunshot, explosion, scream, tone of voice, alarm, etc.

Keywords (including the tests described herein) may be used to determine whether the audio data should be archived, to determine whether the communication is violating a compliance policy such as Sarbanes-Oxley and if a prescribed action should be taken, to determine whether the communication is triggering a policy that specifies an action to be taken such as controlling video cameras to record events in an area of interest or highlighting a video recording being displayed at a console. Metadata such as the communication metadata including location information and sensitivity of the location may be used in conjunction with the keywords to determine what actions to take. Different locations may be assigned different priority levels or type of monitoring to perform. For example, if the monitored site is a shopping mall, the keyword sequence "This is a holdup" may be of higher interest at a bank teller's window than in a toy store where somebody might be playing with a toy gun. This may be defined through the use of triggering policies, which identify the criteria upon which a set of actions or policies should be executed or invoked. The processing system can be configured to chain policies together. Policies may be dynamic; i.e, a policy may be invoked by another policy. Policies may use other information received from other sensors connected to the surveillance system 10, such as fire or smoke detectors, motion sensors, door sensors, alarms, RFID readers, metal detectors, explosives detectors, etc.

For example, if the processing system 22 determines that a communication contains certain keywords, it may activate a policy that looks for other keywords, and a policy that requires recording of the audio data and/or video recording of the location from which the audio data was sent. The system may track information from one communication to another, such as determining that somebody has said "This is a hold-up" and then later, "Give me the money" or other phrase that is now of interest after "This is a hold-up" has been detected.

Figure 7:
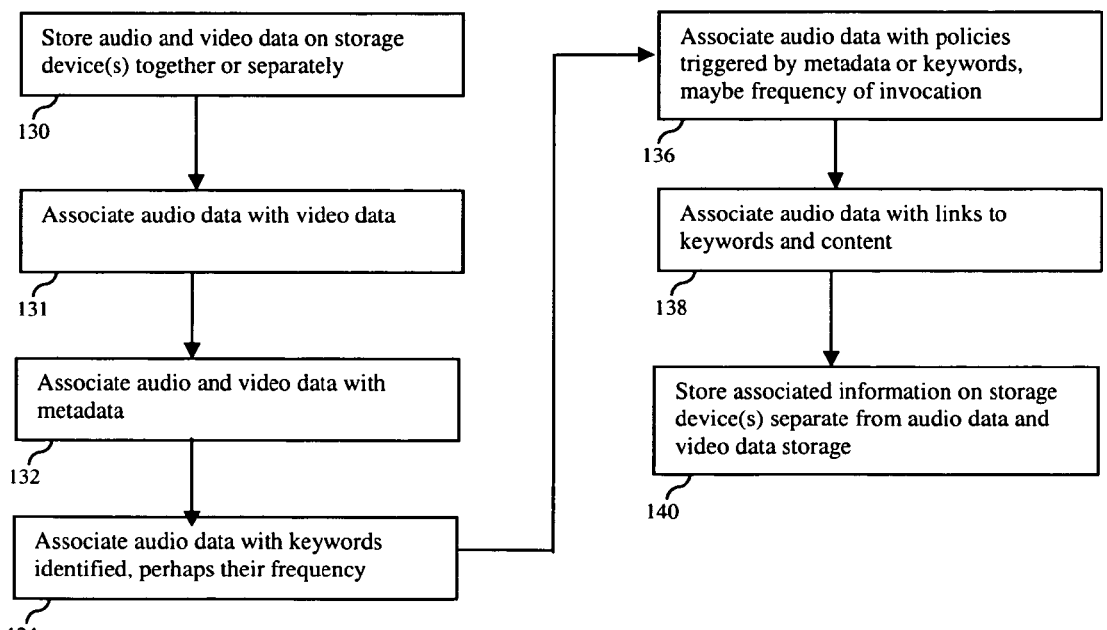
FIG. 7 is a flowchart illustrating archival of audio and video data.

Archiving the audio and video data is shown in FIG. 7. If the processing system 22 determines from the keywords that the auditory data should be archived, it can direct the AV system 24 to store the audio and/or video data on its storage device 26, step 130, or store the auditory data content in its own storage device if so configured. In step 131, the audio data may be associated with the video data, and indexing (such as by timestamp) may be performed so that a particular point in time can be examined in both the audio and video data. The processing system 22 may store the associated metadata with the auditory and video data, step 132. The metadata may be used in machine-assisted searches to identify and retrieve archived communications that match desired parameters. Thus, the processing system 22 may be used to identify keywords in a communication, and based on the presence of those keywords and possibly the associated metadata, determine that audio and video data are to be archived somewhere, that the surveillance system 10 should initiate video recording of the location (from which the communication originated, or some other location of interest), or that the surveillance system 10 should notify the user and/or highlight display of the video of the location. Metadata indicating the presence and frequency of the identified keywords would be included with the archived communication or video to facilitate later search and retrieval, step 134. The metadata could contain pointers to the keywords in the lexicon, or the metadata could contain the keywords themselves.

In an embodiment, audio data (and/or video data) may be archived with metadata indicating which policies were triggered, step 136, such as by including the policy ID, the policy signature (hash), index, or pointers to specific elements within the policy that are applicable to the triggering message. A policy may be invoked more than once, and its frequency of invocation could be recorded in the metadata. Other metadata may also be included, such as the microphone ID, the microphone location, the microphone coverage area and/or location, the time and date the audio data was received, which video camera(s) 12 was/were used to record the events at that or other related locations, etc. The surveillance system 10 could also incorporate other information such as cash register transactions, radio frequency identification (RFID) tracking information, and other types of tracking information. Also included in the metadata may be a hyperlink, pointer, or index the keywords into corresponding parts of the recorded communication to the keywords and relevant portions of the audio data and/or video data, step 138. This information may be stored together with the audio and/or video data, separately, or on another storage device.

The recording media for archival may be selected by the user/administrator or policy. For example, VoIP network data (including the communication), metadata, communication text (if any), and associated video recordings (if any) may be recorded to "write once read many" (WORM) media, re-recordable media, erasable media, solid state recording media, etc. EMC Centera, available from EMC Corporation, is a magnetic disk-based WORM device that is well-suited for storing such data. Selection of media and location of the media are determined by the requirements of the user/administrator and the purpose of the recording. In cases where the recordings may be used for legal purposes such as evidence in a court of law, the media chosen would be specified by law. In these cases, nonvolatile, write once media that reside at an off-site location (possibly stored with a third party acting as an escrow agent) may be used. The user/administrator or policy can specify multiple and varied forms of media. The various types of metadata may be stored on separate storage devices from the communication content itself, step 140.

The processing system is not limited to the specific examples of architecture of the network-data-to-text processing system or the storage system used for the voice and text data. For example, it is applicable to tape storage and all other data storage devices, various functions may be combined or separated among other components in the surveillance system 10, and other components may be added or removed.

All audio and video data may be archived automatically, and the processing system 22 could direct AV system 24 to store any identified keywords with each communication to indicate that those keywords were found in that communication, as well as any associated video recordings. Identified keywords may be stored separately and indexed to the audio and/or video recordings.

Other audio data processing may be performed together with or separately from archival. For example, audio data may be highlighted and/or notification sent to a user when keywords are identified that are predefined as requiring additional analysis. The audio data may be archived with metadata indicating the presence of the keywords and that the recorded communication is classified as an "interesting" communication to be highlighted. This decision may be based solely on the presence of the keywords, or it may take into account metadata such as the identity of the microphone, location of the microphone, time of the day, etc. For example, if a bank is supposed to be closed on weekends, but voices are detected in an area normally expected to be deserted, a policy may specify archiving and/or highlighting of the audio and video feed(s) covering that area.

An embodiment is illustrated in FIG. 8. An auditory data communication and its metadata are received in step 150, and policies-are invoked based on the metadata, step 152. This may include selecting a lexicon or group of lexicons to use. For example, if the metadata includes location information, a lexicon may be selected based on the location (thus allowing for location sensitivity of some keywords). The communication is compared to the lexicon to determine whether positive or negative matches to the keywords are present in the communication, step 154. The policies are used to determine the proper action based on the positive and negative matches found, step 156. The specified action may include searching for additional keywords in the communication. Policies may be invoked by the resulting positive and/or negative matches, and their specified actions executed (such as highlighting the communication, notifying a user, selecting video feeds to be highlighted on the console 20, archiving the communication and/or video feeds, etc.), step 158.

Upon a communication's classification as a highlighted communication, a human operator or machine system may be notified, and the communication may be made available for further analysis and processing. For example, a communication containing keywords that trigger highlighting could be routed to a human operator for listening in real time, while the communication is still taking place. This would require the processing system 22 to be processing live communications. The processing system 22 may also direct the console 20 to highlight a video feed that displays the area around the microphone 14 that detected the communication, or an associated area. For example, if "This is a hold-up" is detected at a bank teller's location, associated areas may include the bank vault, entrance to the bank, etc. and those areas may be selected for audio/video recording and/or highlighting. The communication, keywords, and metadata may be associated with the selected video(s). Metadata may be reported to the console 20, such as the detected keywords, the policy or policies invoked, actions taken, location of the microphone 14, location of the video camera 12 selected, and associated locations of interest.

Additional metadata regarding the notification may be created and added to the highlighted communication's metadata, such as the date of notification, required response time/date, triggering policy and keywords, message ID, identity of the notified parties, etc. As the highlighted communication is processed through a work flow (for review, approval, etc.), the associated metadata is appended to the highlighted communication's metadata and retained until a defined expiration date, if any.

The AV server 24 can be configured to retain archived audio/video recordings and associated data until a specified disposition date, which may be determined by keywords identified in the audio recording or policies invoked by the audio recording. For example, a routine communication might be retained for 10 days, but if the communication contains certain triggering keywords or triggers certain policies, the communication might be retained for 90 days, 1 year, or longer. Upon reaching the disposition date (or expiration date), the stored communication and associated metadata may be partially or completely destroyed. Other types of processing and disposition may be invoked upon reaching the expiration date, such as hierarchical storage management functions (e.g., moving the data from disk drive media to optical or tape media), bit rate, encryption, application of digital rights management services, service level agreements, and other services associated with information lifecycle management. This processing may be performed by the processing system or other system.

Specific keywords can be known by personnel on the premises and deliberately spoken in order to invoke a desired policy. For example, if a security officer on the ground observes a suspected shoplifter, he/she could say "Shoplifter observed", and the policy that is triggered by the keywords initiates actions that cause audio and/or video recording of the area where the security officer's words were detected.

Metadata may be used to trigger a policy, as shown in step 160 in FIG. 9. The policy may identify the lexicon(s) to be used, step 162, and the audio data is compared to the lexicon(s) to find keyword matches, step 164. The keyword matches (whether positive or negative) are used to invoke policies, step 166, and the actions specified by the policies are executed, step 168. One such policy might specify archiving audio data from the audio sensor that triggered the policy, selecting video camera(s) 12 and/or microphone(s) 14 to monitor an area of interest specified in the policy, archive video data from video camera(s) 12, archive audio data from microphone(s) 14, notifying the user via console 20, and displaying the audio and video data from the highest priority video and audio feeds (and optionally the lower priority feeds as well).

Figure 10:
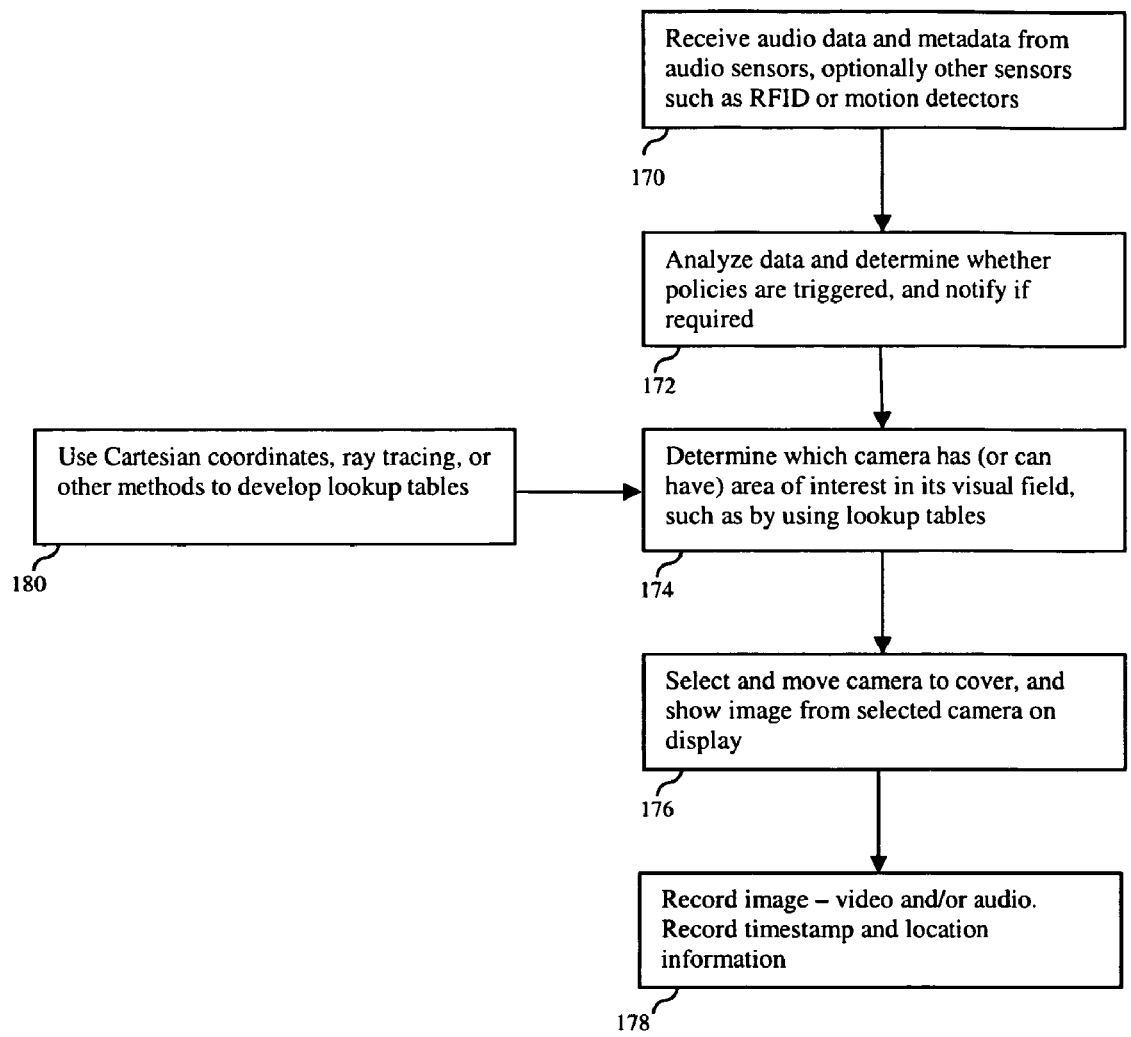
FIG. 10 is a flowchart illustrating the operation of the surveillance system using audio, video, and other sensors.

Surveillance systems may incorporate a number of video cameras 12 trained on particular locations within the store, such as areas in the vicinity of microphones 14, doorways, safes, storage areas, and other areas of interest. These cameras 12 may be configured to pan, zoom, and tilt automatically at regular intervals, or be remotely controlled by an operator who wishes to focus on a particular area. Most of the time, however, the images displayed are of little interest to security personnel, who must continually watch the images from multiple cameras and attempt to spot suspicious activity. The surveillance system 10 could notify security personnel of events warranting greater scrutiny, based on auditory information obtained from any of microphones 14 and other sensors such as RFID, motion, explosives, or biological detectors. This is shown in FIG. 10 as steps 170 and 172. The security personnel could acquire a visual image of people involved through a camera 12 trained on the area corresponding to a microphone 14 that picked up the auditory information of interest, and thereafter observe those people on the various cameras 12 as they move through the store. The tracking may be done automatically or manually as described herein. The surveillance system 10 determines which areas to monitor and cameras to use for monitoring the areas, step 174. Cameras 12 are selected and controlled (if necessary and if configured to do so) to view the areas, and the video data from the cameras 12 are displayed to the user at console 20, step 176. Microphones 14 in the areas of interest may be activated, and audio and video data from the areas of interest are recorded along with metadata, step 178.

When audio signals are picked up by microphones 14, they are transmitted (including analog or digital form) to the AV system 24 and/or processing system 22. AV system 24 may record the signals and/or pass them to console 20 for presentation to the user(s). Processing system 22 analyzes the audio data to identify keywords such as spoken words, alarms, gunshots, etc. Policies may be triggered by keywords identified in the auditory data. These policies may include recording and/or highlighting the audio data and associated video data with a notification to the user(s). Selection of associated video data may be performed by selecting the video camera(s) 12 associated with the microphone 14.

Audio and video data may be buffered in the surveillance system 10, such as by AV system 24, so that if keywords are identified in the audio data, audio and video data concurrent with or preceding the detection of the keywords in the audio data may be recorded and/or highlighted. Highlighting may be performed by displaying the video data to the user in a primary window, causing the window border to change color (such as to red) or blink, popping up a dialog or window, or other means of calling the user's attention to the displayed video data. In an embodiment, the audio and video data may be continually recorded, and when keywords are found, archiving and/or presentation of the audio and/or video data may be made from the recording at a point several seconds prior to the occurrence of the keywords. This enables the surveillance system 10 to capture more of the context for archiving and/or presentation to the user. A temporary storage area (in RAM, on a disk drive, or other suitable storage device) may be used for recording audio/video data from the cameras 12 and microphones 14, and any data that is not selected for archiving/recording or presentation to the user(s) may eventually be discarded by allowing the storage space to be overwritten with new data. The size of the temporary storage may be any convenient size and be large enough to store several seconds, minutes, hours, or even days or weeks of data.

In an embodiment, the surveillance system 10 may comprise a lookup table of associations between microphones 14 and cameras 12 that have the microphones' coverage areas in their field of view or can be moved to have them in their field of view. Step 174. The lookup table may include associations between areas of interest and cameras 12 that have them in their field of view. A triggered policy may, for example, specify monitoring of the microphone's coverage area and other areas of interest such as doors, safes, vaults, alleys, cash registers, etc. These areas may be selected on a desire to monitor those areas when a certain policy is triggered. An area around a microphone 14 may be considered to be an area of interest. The policy may specify a priority level for each area of interest to be monitored when it is triggered. Thus, for example, an area around the microphone receiving the triggering keywords may be assigned highest priority, while other areas of interest may be assigned other priority levels. This information about priority levels may be used by console 20 in determining how to display video feeds from cameras 12 monitoring the areas of interest. It should be understood that in this context, "area" is used to mean a particular extent of space, and is not intended to be limited to two-dimensional spaces.

The processing system 22 could use the lookup table to identify a camera 12 that is able to see the area around a microphone 14 (which has detected the audio data that triggered the camera selection). The lookup table may comprise information about camera movement such as pan, zoom, and tilt (PZT) to cover the desired location, and the surveillance system 10 could automatically operate a camera 12 to cover that desired location. PZT information may be sent to AV system 24 or a video camera controller to cause the selected camera to pan, zoom, and tilt to the desired settings. Video data (which may be analog or digital) is received from the camera 12, and processed as required. The video data may be recorded by AV system 24 with appropriate metadata such as associations to audio data from the microphone 14, keywords found in the audio data, policies triggered, and other metadata. The video data may be forwarded to console 20, optionally along with the audio data, keywords, policies, and other metadata, for presentation to the user(s). Step 176. The lookup table may comprise ranking or priority information for the video cameras able to monitor each area of interest, to facilitate selection of a camera 12 that gives the best view of the area of interest. The user may be given the ability to override the selection.

In an embodiment, presentation to a user may be made using a display (such as a video monitor) on which all or a subset of video feeds are displayed in windows arranged in a grid pattern, with a main window (which may be placed in the center, sized larger than the others, etc.) displaying a video feed. The main window may be changed to display a video data stream from any of the video cameras 12, manually selectable by the user or automatically selectable by the surveillance system 10 to highlight a video feed considered to be of interest based on auditory data received by a microphone 14. When the surveillance system 10 detects keywords that it considers to be "interesting" based on policies triggered by the keywords identified in the audio data received by a microphone 14, it may select a video camera 12 to view the area around the microphone 14, and cause the main window to display the video data from the selected camera 12. Audio data from the microphone 14 may be presented to the user using a speaker provided at the user station. Information regarding keywords identified, conversation text, policies triggered, actions being taken, and other information may be presented to the user on the display, such as in the main window, below it, or in a status window (which may be a fixed area on the display or a pop-up). A plurality of displays may be used, each display with its own video feed, or multiple video feeds displayed on each as described above. These displays may be collocated or located individually or in combination at multiple local and remote locations.

The processing system 22 may be configured to assign priority levels to the audio/video feeds, specified by policies based on keywords and other information such as location. For example, a policy might state that a gunshot in any area would receive highest priority. A particular sequence of words such as "Hide this" might have higher priority in a retail location than the same sequence of words in a parking lot, while a scream in the parking lot might have still higher priority. Priority levels can be signified by numbers, such as having "10" represent the highest priority and "1" represent the lowest priority.

The display could be configured to show the video feed with the highest priority in the main window, and the lower priority video feeds in other windows. There may be other video feeds associated with a triggered policy for a particular microphone, and these video feeds may be displayed in other windows. If there are insufficient video feeds of interest (i.e. no other video feeds associated with triggered policies), extra windows could be left blank or display video feeds from other cameras in a time-multiplexed manner.

Console 20 may facilitate manual control of cameras 12 and audio/video feeds displayed, through conventional means such as dials, joysticks, and switches. Control signals may be conveyed from console 20 to AV system 24 or a video camera controller to select cameras and manually adjust pan, tilt, and zoom. The image from the selected camera(s) 12 is displayed on the monitor(s), step 76, and the AV system 24 may be manually directed to record the video data from the selected camera(s) 12 as well as selected microphones 14 (or microphones 14 in the area being viewed by the cameras 12). Console 20 may comprise a microphone for the user to record comments and other information. The user could specify which audio/video data should be associated with the user-supplied audio data, and the AV system 24 could be configured to archive the recorded audio/video data from the cameras 12 and microphones 14, along with the user-supplied audio data. The user-supplied audio data could be provided to processing system 22 for keyword analysis and generation of metadata (all of which could be recorded), and policies could be triggered based on the analysis.

For example, the user might state in the audio recording that a shoplifter has been spotted in a particular window being displayed at console 20. The processing system 22 could determine from the user audio data that a shoplifter has been spotted, and based on this, trigger policies that provide for recording and highlighting of audio and video data from the cameras 12 and microphones 14 in the area being monitored by the user-identified display. All of this information may be archived by AV system 24, and associated to each other.

In an embodiment, the surveillance system 10 may employ a Cartesian coordinate system for identifying the locations of various elements (such as cameras 12, microphones 14, doorways, cash registers, etc.) in the monitored site. Coordinates may be specified in xyz format, giving positions along the x-axis, y-axis, and z-axis. A microphone 14 could be associated with information giving the xyz position of the microphone, and its zone of coverage in which it is able to reliably pick up auditory information with sufficient clarity as to facilitate analysis by the processing system 22. The zone of coverage may be specified as a set of Cartesian coordinates, which may be computed by using equations defining the range of the microphone in various directions. Similarly, a video camera 12 may be associated with xyz coordinates describing the position of the camera 12, and its zone of coverage computed by using equations defining the range of the video camera 12 in various directions. Appropriate PZT settings for a camera to monitor its zone of coverage would be included. The monitored site may be represented as a collection of cubes of appropriate size (such as 1 cubic foot), each with a unique xyz position (Cartesian coordinates). Such cubes could range in size from a single Cartesian point to a range of any number of Cartesian points. Other types of increments and other coordinate systems may be used, such as Global Positioning System (GPS). A table may be used to track the information for each cube. Each coordinate may be associated with a list of microphones 14 and cameras 12 that are able to monitor it, as determined from the computations described above. The appropriate PZT settings for each camera 12 to monitor that coordinate may be associated with the coordinate and that camera 12. In an embodiment, microphones 14 and cameras 12 may be associated with a list of coordinates that they are able to monitor, with the appropriate PZT settings associated to the entry for each coordinate in the list.

An area of interest may be associated with a range or list of coordinates that are within the area of interest, as well as a coordinate that indicates the center of the area. Areas of interest may include areas around microphones, cash registers, entryways, ATM machines, storage rooms, safes, etc. A list of areas of interest may be kept, with references to the range or list of coordinates that are within the areas of interest. Other types of data structures may be used, such as objects. Each coordinate is associated with a list of cameras 12 that are able to monitor it, and PZT settings for the cameras 12 to monitor it.

When the processing system 22 identifies keywords that trigger a policy requiring video monitoring of an area of interest (which may be the area of the microphone 14 that sent the audio data including the keywords), the surveillance system 10 may check the list of areas of interest to identify the Cartesian coordinates for the area of interest. If an object-oriented approach is used, the object associated with the area of interest may be queried to obtain the coordinates. In an embodiment, the Cartesian coordinates (cubes) representing the areas of coverage for each camera 12, microphone 14, and all relevant sensing devices are compared to the Cartesian coordinates of the area of interest. When any or all coordinates (cubes) match, it indicates that the associated sensing devices (such as the video cameras, microphones, etc.) provide coverage for the area of interest. Based on such matches, actions can be triggered programmatically based on policy or manually by the user. Through use of the disclosed data object model which includes location, coverage area and its location, and time, it enables searches for and identification of all relevant data (live data and recorded data) as determined by any combination of factors such as object (which can include people, animals, parts, or any physical items), time, date, event, keyword(s), location, etc. The disclosed data object model enables manual and programmatic multidimensional searches and associations across a variety of media types.

In an embodiment, each coordinate is checked to determine which video camera(s) 12 are able to monitor it. If there are several video cameras 12 able to monitor various coordinates in the area of interest, the video cameras 12 may be prioritized. Prioritization could be based on percentage of the coordinates that a video camera 12 can monitor, distance of the camera 12 from the center of the area of interest, distance of the coordinates that can be monitored from the center of the area of interest, PZT parameters required for the camera to view the coordinate, and user-selected ranking. The prioritized list may be used for recording and/or display purposes, where the highest priority camera 12 will have its video feed displayed in a main (primary window) or recorded with an indication that this video data has the highest priority ranking. Other cameras 12 with lower priorities may be displayed in secondary windows or recorded with an indication of priority. Lower priority views may be time-multiplexed on the display or not shown by default, with buttons or other means to allow the user to select them for viewing. The evaluation of video camera(s) 12 to monitor an area of interest may be performed ahead of time, and a lookup table used to store the results of the evaluation (thus associating areas of interest to cameras with information about prioritization, PZT, and other ancillary data). Console 20 may provide the user with the ability to override the prioritization, and select another camera 12 as the primary video source for monitoring that area of interest, add or remove cameras 12, or otherwise revise the list of cameras 12 and prioritization.

Other methods may be used for determining collision or intersection of video camera coverage areas with areas to be monitored, such as ray tracing or other methods for representing virtual worlds. These methods may be employed each time the surveillance system 10 identifies an area to be monitored and selects video camera(s) 12 to view the area, or used in advance and the results stored for reference by the system.

Thus, the associations between video cameras 12 and areas of interest may be rapidly configured without need for a lengthy manual process of determining which cameras 12 are suitable for coverage of those areas. In an embodiment, the surveillance system 10 may present the user with a list of video cameras 12 that it suggests for viewing an area of interest, and the user may reconfigure that list and modify as desired.

Communications may be recorded, processed into text (speech-to-text), and then formatted for delivery to an email archive and management system, such as LEGATO EmailXtender, EmailArchive, or EmailXaminer, available from EMC Corporation, for later retrieval, analysis, and other disposition. The data objects that are held in the EmailXtender/EmailArchive/EmailXaminer system (Legato Information Lifecycle Management System or like system) are audio, video, the voice-to-text transcription of the conversation, and other metadata as described herein. If other information such as cash register information and RFID tracking information (time, date, location, information about the object to which the RFID tag is associated, etc.) are tracked by the system, this information may be included in the data objects. The VoIP communication and video data elements (and their derivative elements) may be packaged in such as way as to make them manageable by email systems and email management systems such as Microsoft Exchange, Microsoft Outlook, and LEGATO EmailXtender.

The presentation to the user of this information may be through an email client application, and have a front-end appearance to the user of an email message in the Inbox. The relevant communication information (text, audio, video, metadata, etc.) may be contained within this pseudo-message, with hyperlinks or other references to portions of the audio data containing keywords and relevant portions, and to associated portions of the video data. The user may use these links to confirm that certain keywords were found and to understand the context (such as to determine whether a law or regulation has been violated). Clicking on a link, for example, might cause the text to be displayed, the audio to be played, and the video recording(s) to be displayed so that the user can understand what transpired.

Users and administrators could easily and quickly archive, retrieve, analyze, sort, and filter hundreds of thousands of communications and associated data in the same manner they handle email messages.

Compared to simply sending a voice recording of a communication or a video recording of a location to an email recipient (the recording will be treated by the email server as an attachment), this approach would allow the system to detect and understand that the attachment is an audio or video recording and process it in a completely different manner than typical email messages with attachments.

Although the methods and systems herein have been described with respect to an illustrative embodiment, it should be appreciated that the methods and systems disclosed are independent of the precise architecture of the network-data-to-text processing system or the storage system used for the audio and video data, and are applicable to tape storage, optical devices, and all other types of data storage. The principles are equally applicable to VoIP, PSTN, PBX, digital, analog, and all other systems useful for processing audio and video data.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method of monitoring a location having a plurality of audio sensors and video sensors, comprising:
   receiving auditory data from at least one of the plurality of audio sensors;
   comparing at least a first portion of the auditory data to a lexicon comprising a plurality of keywords;
   invoking at least one policy based on the comparison;
   determining a first area to be monitored based on the invoked policy, wherein the first area is selected from a plurality of monitored areas;
   assigning a priority to the first area to be monitored based on the invoked policy; and
   based on the priority, selecting at least one video sensor to monitor the first area.

2. The method as recited in claim 1, further comprising comparing at least a second portion of the auditory data to the lexicon if the first comparison returns a positive result.

3. The method as recited in claim 1, further comprising determining a second area to be monitored and selecting at least one video sensor to monitor the second area.

4. The method as recited in claim 1, wherein selecting the at least one video sensor includes determining at least one video sensor associated with the area.

5. The method as recited in claim 4, further comprising searching a lookup table to determine the at least one video sensor associated with the area.

6. The method as recited in claim 5, further comprising determining a primary video sensor and a secondary video sensor associated with the area.

7. The method as recited in claim 6, wherein determining the primary sensor and the secondary sensor includes reading data indicating the primary sensor and secondary sensor from the lookup table.

8. The method as recited in claim 4, further comprising querying an object associated with the area to determine the at least one video sensor associated with the area.

9. The method as recited in claim 8, further comprising determining a primary video sensor and a secondary video sensor associated with the area.

10. The method as recited in claim 9, wherein determining the primary sensor and the secondary sensor includes querying the object for data indicating the primary sensor and secondary sensor.

11. The method as recited in claim 4, further comprising determining configuration information for the at least one video sensor.

12. The method as recited in claim 11, further comprising controlling the video sensor in accordance with the configuration information.

13. The method as recited in claim 12, wherein the configuration information includes at least one of the group comprising pan, zoom, or tilt information.

14. A system for monitoring a location, comprising:
a plurality of audio sensors configured to transmit auditory data;
a plurality of video sensors configured to transmit video data; and
a processor;
wherein the processor is configured to:
receive auditory data from at least one of the plurality of audio sensors;
compare at least a first portion of the auditory data to a lexicon comprising a plurality of keywords;
invoke at least one policy based on the comparison;
determine a first area to be monitored based on the invoked policy, wherein the first area is selected from a plurality of monitored areas;
assign a priority to the first area to be monitored based on the invoked policy; and
based on the priority, selecting at least one video sensor to monitor the first area.

15. The system as recited in claim 14, configured to select the at least one video sensor by determining at least one video sensor associated with the area.

16. The system as recited in claim 15, further configured to search a lookup table to determine the at least one video sensor associated with the area.

17. The system as recited in claim 16, further configured to determine a primary video sensor and a secondary video sensor associated with the area.

18. The system as recited in claim 17, further configured to determine configuration information for the at least one video sensor.

19. The system as recited in claim 18, further comprising a controller configured to control the at least one video sensor, and wherein the processor is configured to instruct the controller to control the video sensor in accordance with the configuration information.

20. A computer program product for monitoring a location having a plurality of audio sensors and video sensors, comprising a computer usable medium having machine readable code embodied therein for:
receiving auditory data from at least one of the plurality of audio sensors;
comparing at least a first portion of the auditory data to a lexicon comprising a plurality of keywords;
invoking at least one policy based on the comparison;
determining a first area to be monitored based on the invoked policy, wherein the first area is selected from a plurality of monitored areas;
assigning a priority to the first area to be monitored based on the invoked policy; and
based on the priority, selecting at least one video sensor to monitor the first area.

\* \* \* \* \*